United States Patent [19]

Bear et al.

[11] 4,338,352

[45] Jul. 6, 1982

[54] PROCESS FOR PRODUCING GUIDED WAVE LENS ON OPTICAL FIBERS

[75] Inventors: Philip D. Bear, Godfrey, Ill.; Gordon H. Burkhart, Florissant, Mo.

[73] Assignee: McDonnell Douglas Corporation, Long Beach, Calif.

[21] Appl. No.: 236,835

[22] Filed: Feb. 23, 1981

[51] Int. Cl.³ .................... G02B 5/14; G02B 3/00; B05D 1/18
[52] U.S. Cl. .................................. 427/8; 427/9; 427/10; 427/53.1; 427/163
[58] Field of Search .................. 427/8, 9, 10, 53.1, 427/163

[56] References Cited

U.S. PATENT DOCUMENTS 4,067,937  1/1978  Unno et al. .................... 427/163 X Primary Examiner—James R. Hoffman
Attorney, Agent, or Firm—George W. Finch; John P. Scholl; Donald L. Royer

[57] ABSTRACT

A lens is produced on the end of a single mode optical fiber by first coupling light into the fiber so that the light projects out the end of the fiber on which the lens is to be produced. The fiber end is then dipped in and out of a drop of negative photoresist and held in a vertical position while the photoresist wicks up the fiber and dries. The dipping and drying is continued until a sufficient lens of photoresist is built up which lens tends to build in the desired shape due to the Gaussian distribution of the light projecting out the end of the fiber and the flow of photoresist up the fiber.

11 Claims, 14 Drawing Figures

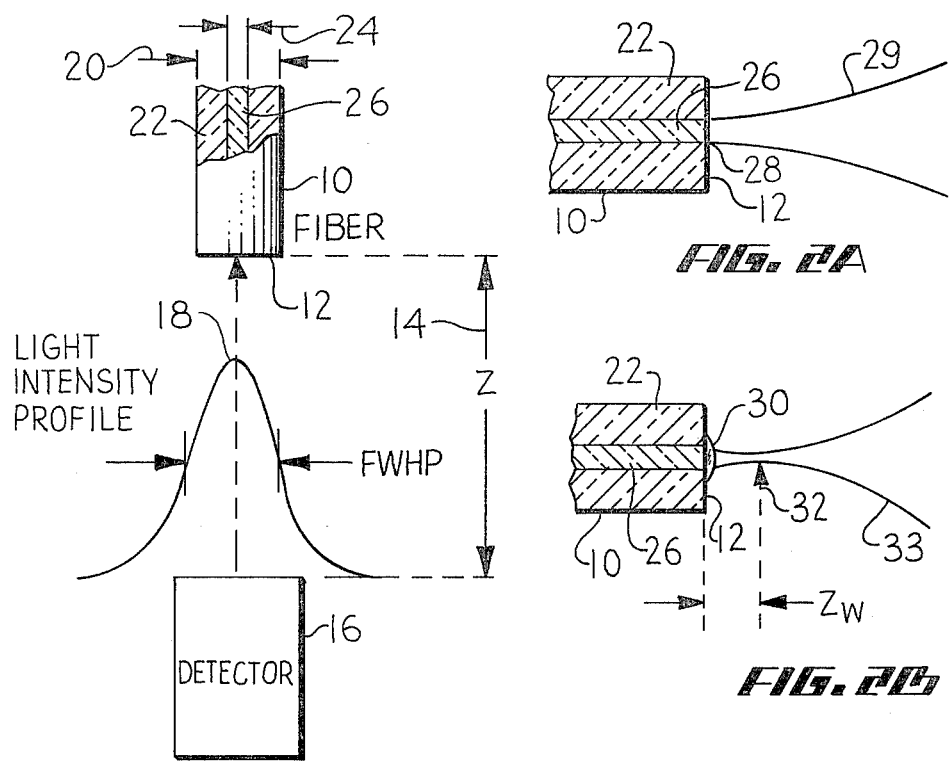
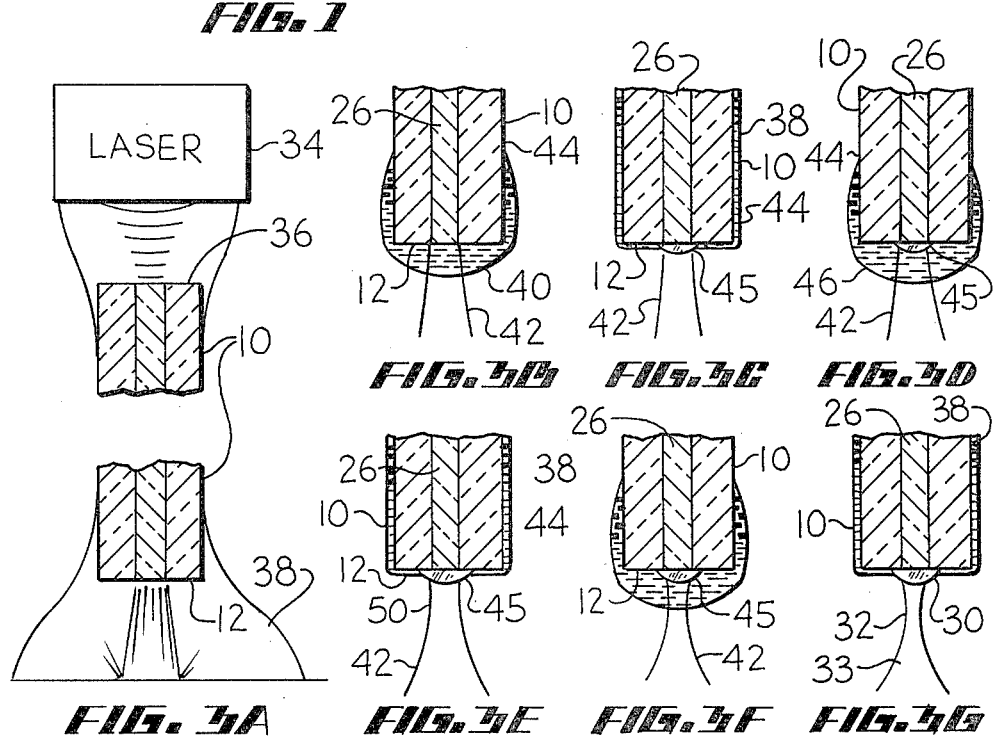

PROCESS FOR PRODUCING GUIDED WAVE LENS ON OPTICAL FIBERS

BACKGROUND OF THE INVENTION

As optical transmissions of data communications and other signals are becoming more common, it is desirable to reduce the size of optical transmission, optical amplification and other related devices to a minimum by using "integrated optics". Communication between optical waveguide devices normally is accomplished by means of optical fibers which must be capable of efficiently coupling light between devices. Unfortunately, maximum fiber to waveguide coupling occurs when the separation between the fiber end and the waveguide is zero, and the cylindrical fiber mode is centered on the waveguide. In addition, coupling efficiency is affected by the relative mode sizes between the fiber and the waveguide, and a large area mismatch between the circularly symmetric fiber mode and the normally narrow, rectangular shaped waveguide edge reduces the coupling significantly.

It has been recognized that a lens placed on the end of guided wave devices like optical fibers can increase the light coupling to an adjacent device, a desirable result. The area mismatch problem can be attacked by using the lens to form the light beam emitting from the end of the fiber core to a beam which contracts into a waist smaller than the diameter of the core at a distance from the fiber. On unlensed fibers, the core diameter and the core to cladding index difference determines the waist and the waist exists at the end of the fiber. Since the goal of integrated optics is to miniaturize all optical components, the best solution for positioning the lens is to place it directly on the end of the fiber. Several methods of doing this have been reported in the open literature, such as in Cohen, et al, Applied Optics, Volume 13, page 89, 1974. In addition to increasing the coupling efficiency by decreasing the area mismatch, a lens system can achieve maximum coupling without the requirement of bringing the fiber into near contact with the waveguide. In practice, it is extremely difficult to determine when the fiber is within one micrometer of the waveguide edge and yet not touching. When a fiber end actually makes contact with a waveguide, the fiber is usually damaged, yet to obtain efficient coupling without a lens requires one micrometer or less separation so that the waveguide is not any further than necessary away from the actual beam waist at the end of the fiber. When contact damages the end of the fiber, the emitted light is no longer Gaussian in nature and the coupling becomes very poor. By using a lens on the end of the fiber, a new smaller waist is situated away from the fiber end so that not only is the coupling efficiency maximized but the probability of being able to locate the components for the maximum coupling efficiency without damaging the fiber is increased.

Cohen, et al, mentioned above, has reported a process for placing lenses on single mode fibers by first cleaning the fiber in boiling solvents, then placing photoresist on the fiber and baking it, exposing the photoresist with ultraviolet light traveling through the core of the fiber, developing and rinsing the photoresist and baking the new lens formed of photoresist. To produce a lens by this method one must know the thickness of the photoresist prior to exposure so that the amount of light reaching the fiber end and exposure time can be balanced to fabricate the desired lens. If these parameters are not properly controlled, the whole process can fail in at least two ways. First, if there is insufficient light or the exposure time is too short, the photoresist is underexposed and simply washed away during the developing and rinsing process. If the photoresist is overexposured, a "flat top" lens is produced. This is due to the complete exposure of the photoresist over an area centered around the peak of the Gaussian light distribution out the end of the fiber. Therefore, a new process which is simpler and eliminates the need to clean the fiber as well as the need to know the thickness of the photoresist, the precise power of light carried by the fiber, and the exposure time of the photoresist, has been required.

BRIEF DESCRIPTION OF THE PRESENT INVENTION

The present invention makes use of negative photoresist to form a lens on the end of a fiber directly without a development step. The lens is fabricated by first coupling light from a helium neon laser into the fiber core and then dipping the end of the fiber, onto which the lens is to be developed, in and out of a drop of the negative photoresist. Simply touching the fiber to the photoresist drop three times with a few seconds between each contact is sufficient. The fiber is then held in a vertical position with the end downward. The light appears to polymerize the photoresist in accordance with the Gaussian distribution of the light passing out the end. At the same time, the photoresist flows away from the end up the fiber which acts like a single fiber wick so that by the time the photoresist drys, only the exposed portion remains in the form of a lenslet. Once the photoresist is dry, the process is repeated until the desired combination of fiber and waveguide lens is generated to produce the desired waist in the output beam of the fiber. Once the desired waist has been achieved, the process parameters are reasonably repeatable so that production of the lenses can continue on other fibers without the need for extensive testing of the waist size and location as new lens are formed. The process requires no development nor rinse steps since the unexposed photoresist is wicked away rather than washed away.

Therefore it is a object of the present invention to provide a simple and easily controlled process for producing a lens on the end of an optical fiber.

Another object is to provide a photoresist process for producing a lens on the end of an optical fiber which does not require knowledge of the thickness of the photoresist, the precise power carried in the fiber, the exposure time or the developing time.

Another object is to provide a photoresist process for producing lens on optical fiber which is repeatable and requires very little in the way of process controls.

Another object is to provide a method for producing lenses on the ends of optical fibers which can be accomplished without complex manufacturing facilities and measuring devices.

Another object is to provide a process for producing high quality lenses on the ends of optical fibers useful in integrated optics applications.

These and other objects and advantages of the present invention will become apparent to those skilled in the art after considering the following detailed specification in conjunction with the accompanying drawings wherein:

FIG. 1, is a schematic drawing of a system for measuring the far field intensity distribution of light exiting the end of an optical fiber;

FIGS. 2A and 2B, are greatly enlarged views of optical fibers and the light beams projected out the ends thereof with the fiber of FIG. 2B having a lens thereon constructed according to the process of the present invention;

FIGS. 3A, 3B, 3C, 3D, 3E, 3F and 3G are representations in side view of the end of an optical fiber having a lens being built up thereupon by the process of the present invention;

DETAILED DESCRIPTION OF THE PRESENT INVENTION

Figure 4:
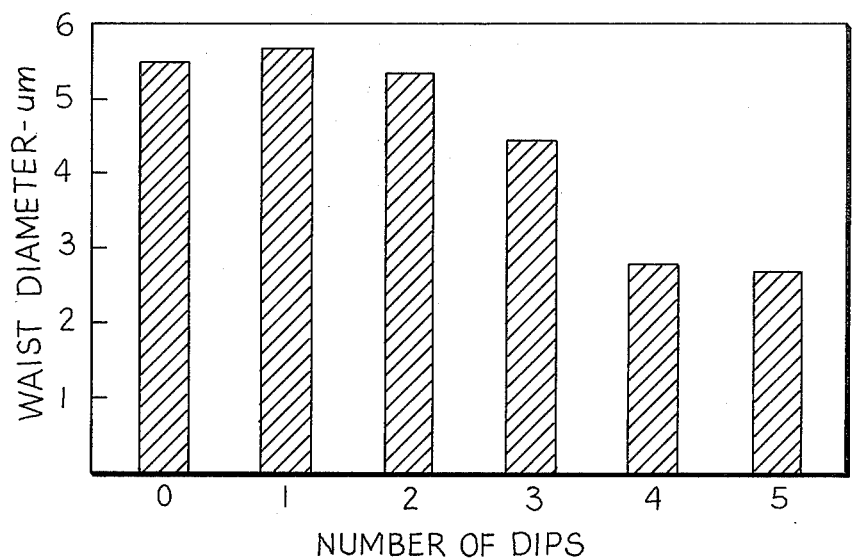
FIG. 4, is a graph showing a typical history of measured waist diameter of a single fiber versus the number of photoresist steps performed in the present process.

The present invention is a process by which lenses can be placed on guided wave devices in order to improve the light coupling characteristics thereof. Communication between optical waveguide devices is normally accomplished by means of optical fibers such as the fiber 10 shown in FIG. 1, which must effectively couple light between the devices to raise the total efficiency of the system in which they are used. Therefore, the present inventive process is explained with regards to producing lens on the right angle end 12 of an optical fiber 10 although the process can be used with other devices having light transmissibility and the need to couple the light efficiently on an extremely small scale.

The Gaussian beam coupling calculations described by Hall, et al, in Optics Letters, volume 4, page 292, 1979, are applicable to fiber to waveguide coupling, and maximum coupling is shown to occur in the case in which the separation 14(Z) between the fiber end 12 and the waveguide shown as a detector 16 in FIG. 1, is zero, that is (Z=0), and the cylindrical fiber mode 18 is centered on the waveguide. This occurs in part because the waveguide supports a planar phase front mode and the fiber 10 provides a planar phase front only at the fiber end 12. For this discussion, the transverse displacement of the fiber 10, with respect to the waveguide 16, is assumed to be zero as shown.

In addition to the above factors, the coupling efficiency is affected by the relative mode sizes between the fiber 10 and the waveguide 16. For example, if the fiber has a 80 μm diameter 20 cladding region 22 and a 4.5 μm diameter 24 step index core 26 with the experimental setup shown in FIG. 1, the size of the mode $W_0$ emitted by the fiber 10 can be calculated using Equation (1).

$$2W_o = \frac{2\sqrt{.347}\,\lambda}{\pi \tan \phi_{\frac{1}{2}}} \qquad (1)$$

where $2W_0$ is the waist diameter at $1/e^2$ of the power curve, $\lambda$ is the wavelength, and $\tan \phi_{1/2}$ is the tangent of the half-angle obtained from the far field full-width half-power points (FWHP). For the single mode step index fiber of the example, the mode waist diameter is typically 5.6 μm. Using the same technique to measure the light emitted from a polished waveguide edge, the waist diameter in the glass waveguide was found to be 1.8 μm. Therefore, it is clear that there is a large area mismatch between the circularly symmetric fiber mode and the narrow rectangular shaped waveguide edge and this alone can reduce the light coupling significantly.

The area mismatch problem at the waist 28 of the beam 29 can be attacked by using a lens 30 to bring the light from the fiber 10 to a smaller waist 32 as shown in FIG. 2B. Since the goal of integrated optics is to miniaturize all optical components, the best solution is to place a lens directly on the end 12 of the fiber over the core 26. Several methods of doing this, such as Cohen, et al, mentioned above, have been reported but none is as simple as using the negative photoresist process of the present invention. FIGS. 2A and 2B show the $1/e^2$ beamwidth for a fiber 10 with and without a lens 30. It should be noted that the waist 28 of the beam 29 of the fiber 10 in FIG. 2A with no lens is located at the end 12 of the fiber, whereas the fiber 10 of FIG. 2B with the lens 30 produces a beam 33 with a smaller waist 32 which is located a distance $Z_w$ from the fiber end 12. In addition to increasing the coupling efficiency by decreasing the area mismatch by shrinking the size of the beam 13 in the area of the waist 32, the movement of the waist 32 out from the end 12 allows maximum coupling without requiring that the fiber 10 be moved into near contact with the waveguide. In practice it is extremely difficult to know when the fiber 10 is within 1 μm of the waveguide edge and a spacing of more than that results in greatly decreased coupling efficiency. If a fiber end 12 makes contact with a waveguide, the fiber 10 is usually damaged. When this occurs the emitted light is no longer Gaussian in nature so that the coupling becomes very poor. Therefore, with a smaller waist 32 situated away from the fiber end 12, not only is the maximum coupling efficiency increased but the probability of reaching that maximum without damaging the fiber during construction is also increased.

The process to produce the lens 30 uses negative photoresist. Typically, when negative photoresist is used, it is exposed to a light pattern of varying intensity and then dipped into a developer followed by a rinse. This washes away the unexposed regions with the exposed portions remaining. In FIGS. 3A through 3G a typical lens formation, according to the present invention, is shown. For this specific example, Kodak Micro Resist 747 with a 110 Centistoke viscosity was used. The vendor literature for this resist indicates that blue or ultraviolet light is required to expose the photoresist but it has been found that this is not necessary to produce the lens 30 of the present process. The lens 30 is fabricated by first coupling about ~0.1 mW of light from a HeNe laser 34 into the opposite end 36 of the fiber 10 such as by using a suitable lens 37. HeNe lasers have an output wavelength λ of 0.6328 μm and was chosen only because such lasers are common in optics laboratories. As shown in FIG. 3A, the end 12 on which a lens is to be constructed is dipped into the photoresist 38, that is the end 12 of the fiber 10 is touched to the photoresist 38 two or three times with a few seconds between each time of contact. When the fiber 10 is withdrawn from the drop of photoresist 38, a small droplet 40 remains on the end 12 thereof to be exposed by the light beam 42 emitting from the core 26 thereof.

The fiber 10 is held in the vertical position shown with respect to gravity while the photoresist 38 dries and is exposed. As shown, the photoresist 38 flows up the sides 44 of the fiber 10 as though the fiber was a wick so that only the exposed photoresist remains producing a small lenslet 45 on the end 12 of the fiber 10 as shown in FIG. 3C. As shown in 3D, the fiber 10 is dipped again to form another droplet 46 on the end thereof, which being exposed to the light beam 42 passing out of the core 26, polymerizes as the photoresist 38 wicks up the sides 44. As shown in FIG. 3E, the lenslet 45 has grown and the beam 42 begins to develop a reduced waist 50. The steps are continued, usually two or three being required, such is shown in FIG. 3F, until the lens 30 capable of producing the beam 33 having the desired reduced diameter waist 32 is produced. For a given photoresist 38, general laser power level, fiber type, and size, the process is reasonably repeatable so that once it has been experimentally determined that a lens 30 of the proper dimensions is produced by a certain amount of dips, the process can be duplicated without the need for intensive testing of the waist size at the steps shown by FIGS. 3C, 3E and 3G.

The present process, as should be clear by now, is simple, it requiring as a light source only the very common HeNe laser 34. The waist 32 can be monitored as the lens 30 is generated using equation (1) and the experimental setup shown in FIG. 1. FIG. 4, shows a typical plot of the calculated waist diameter versus the number of times the dip step is performed. The significance of this figure is that the lens making can be stopped when a desired waist 32 is achieved whereas into the heretofore known processes, the lens cannot be monitored until the procedure is completed. FIG. 4 also indicates that the process tends to level out at the desired waist diameter so that it is not sensitive to the number of dip steps toward the end of the process. Excessive dipping steps have produced aberations, however. The importance of this to the process is that less precise knowledge is required to produce a suitable lens 30.

Figure 5:
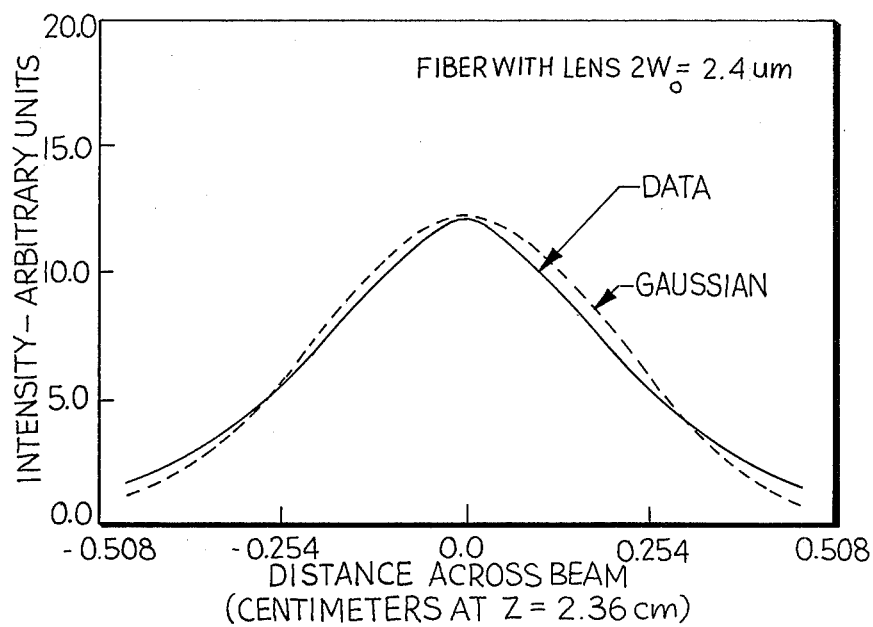
FIG. 5, is a graph comparing the far field light intensity of a fiber with a lens constructed according to the present invention to a Gaussian light distribution.
Figure 6:
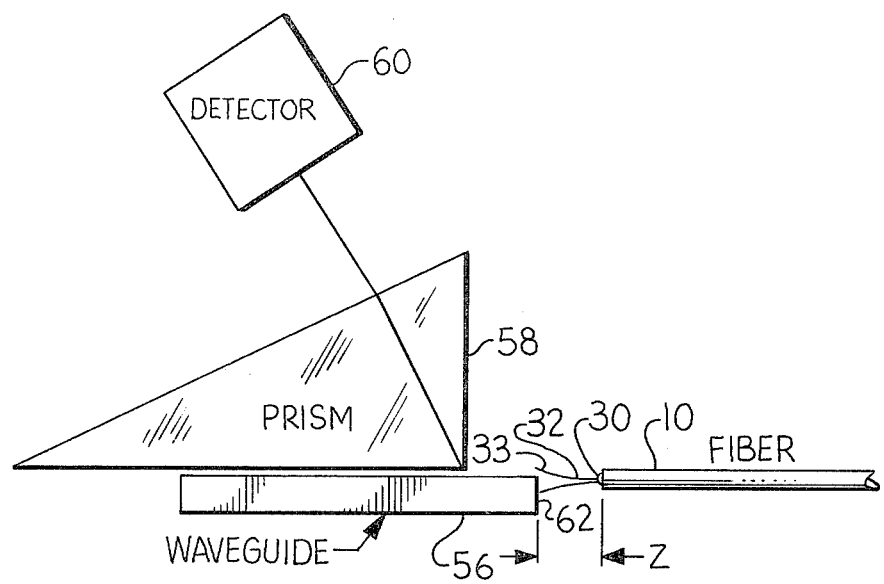
FIG. 6, is a diagrammatic view of a typical experimental coupling arrangement for testing the lens fibers.
Figure 7:
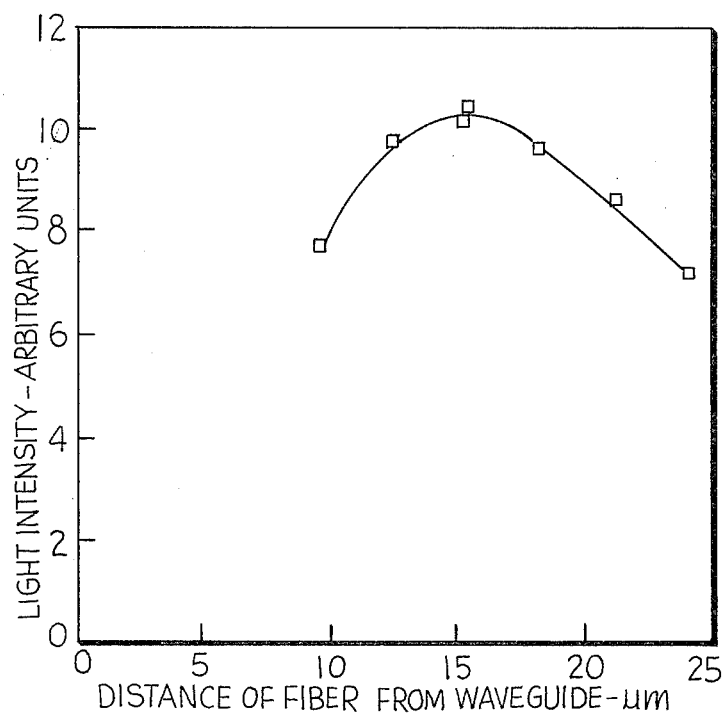
FIG. 7, is a graph of light intensity, as measured in FIG. 6, versus fiber/waveguide distance.

In order to determine the quality of the lenses 30 produced, it must be recalled that it is an important feature of the lens 30 that a defraction limited lens transforms an incident Gaussian beam into a transmitted beam which is also a Gaussian beam. Since the fiber output mode is essentially Gaussian, the photoresist lens 30, if it is a good quality lens, should transform the fiber mode into another Gaussian beam propagating in space. To determine the quality of the lens 30, the measured far field pattern can be digitized and a Gaussian function can be calculated which matches the peak and 1/e values of the data. Such a comparison between the data taken from a typical lens produced by the above process and a calculated Gaussian is shown in FIG. 5. FIG. 5 indicates that the photoresist lens 30 constructable by the present process is of good quality. Microscopic studies have also shown that the lens 30 on the fiber 10 of the example, has a diameter of about 8 $\mu$m which is consistent with the mode size in the fiber 10 of the example. Additional verification of the lensing effet can be seen by performing an experiment in which the light from the fiber 10 is coupled into a polished glass waveguide 56 and is then coupled by a prism 58 out of the waveguide 56 and measured with a photodetector 60. This experimental arrangement is shown in FIG. 6. If the lens 30 is behaving properly, the maximum for the measured light should occur when the beam waist 32 is placed on the end 62 of the waveguide 56. Less light should be coupled into the waveguide 56 if the fiber 10 is either closer or further than this optimum distance from the waveguide 56, previously identified as $Z_w$. As seen in FIG. 7 which plots light intensity versus fiber to waveguide distance for an experimental fiber, there is a maximum in the measured light when the fiber end is at a position $Z = Z_w > 0$. Using the Gaussian beam coupling theory described by Hall, et al, then Equation (2)

$$\eta = \frac{2W_{10} W_2}{W_{10}^2 + W_2^2} \tag{2}$$

where $W_{10}$ is the fiber waist and $W_2$ is the waveguide waist, can be used to calculate the maximum coupling for the two cases when $2W_{10} = 5.6$ $\mu$m or $2W_{10} = 2.3$ $\mu$m and $2W_2 = 1.8$ $\mu$m. For the former case, $2W_{10} = 5.6$ $\mu$m, one obtains $\eta = 0.61$ and for the latter, $2W_{10} = 2.3$ $\mu$m, one obtains $\eta' = 0.98$. This increase in the coupling can be described by the ratio of Equation (3)

$$\eta'/\eta = 1.6 \tag{3}$$

Experimentally, one measures light throughput efficiency rather than coupling efficiency since various losses occur other than coupling. By taking the ratio of the measured throughputs, $T(2W'_{10})/T(2W_{10})$, the losses other than the coupling losses divide out and a comparison can be made to the ratio $\eta'/\eta$. The ratio for the experimental data was found to be as shown in Equation (4)

$$\frac{T(2W'_{10} = 2.3\ \mu m)}{T(2W_{10} = 5.6\ \mu m)} = 1.6 \tag{4}$$

and the agreement between the two ratios is excellent confirming the quality of the lens.

Therefore, there has been shown a novel process for producing a lens on an optical fiber which is adaptable to other such devices as waveguides and laser diodes so long as sufficient light intensity is present to expose the negative photoresist material which fulfills all of the objects and advantages sought therefore. Many changes, alterations, modifications and other uses and applications of the subject process will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. A process for use in an environment subjected to an acceleration force such as gravity for producing a lens on the first end of an optical fiber having first and second ends including the steps of:
    a. coupling light into the second end of the fiber;
    b. dipping the first end of the fiber into negative photoresist;
    c. maintaining the fiber in a position with the first end oriented toward the acceleration force until the photoresist dries; and
    d. repeating steps (b.) and (c.) until the desired lens is formed.

2. The process for producing a lens as defined in claim 1 wherein said negative photoresist has about a 110 Centistoke viscosity.

3. The process for producing a lens as defined in claim 1 wherein step (d) includes a testing substep to determine the diameter of the waist of the beam of light projecting out of the lens being formed.

4. The process for producing a lens as defined in claim 1 wherein said negative photoresist has a viscosity which allows said negative photoresist to wick along the sides of the optical fiber away from the acceleration force as the lens in forming.

5. A process for producing a lens on the first end of an optical fiber having first and second ends and at least one side surface including the steps of:
   a. coupling light into the second end of the fiber so that the light projects out of the first end of the optical fiber;
   b. orienting the fiber in a vertical position with respect to gravity with the first end down;
   c. dipping the first end of the fiber into the negative photoresist;
   d. removing the first end of the fiber from the negative photoresist;
   e. maintaining the fiber in a vertical position with the first end down while a portion of the negative photoresist is exposed by the light projecting out of the first end of the optical fiber and a portion of the negative photoresist wicks up the side surface of the optical fiber; and
   f. repeating steps (b) through (e) until the desired lens is formed.

6. The process for producing a lens as defined in claim 5 wherein step (e) includes a testing substep after the negative photoresist wicks up the side surface of the optical fiber of measuring the diameter of the waist of the beam of light projecting out of the lens being formed.

7. The process for producing a lens as defined in claim 6 wherein step (f) includes a determination substep wherein the diameter of the waist of the beam of light is compared against a predetermined standard to determine if the desired lens has formed.

8. The process for producing a lens as defined in claim 5 wherein step (c) includes dipping the first end of the optical fiber in and out of the negative photoresist in rapid succession at least twice.

9. The process for producing a lens as defined in claim 5 wherein said optical fiber is cylindrical in shape and has a predetermined outer diameter, the viscosity of the negative photoresist being chosen so that said negative photoresist tends to flow up the side surface thereof.

10. The process for producing a lens as defined in claim 9 wherein said negative photoresist has about a 110 Centistoke viscosity.

11. The process for producing a lens as defined in claim 10 wherein said optical fiber has about an 80 $\mu$m diameter, and about 0.1 mW of light of a wavelength of about C.6328 $\mu$m are coupled into the second end.

* * * * *